J. B. & E. I. HENEFIELD.
TWO-ROW COTTON AND CORN PLANTER.
APPLICATION FILED APR. 4, 1911.
1,078,282.
Patented Nov. 11, 1913.
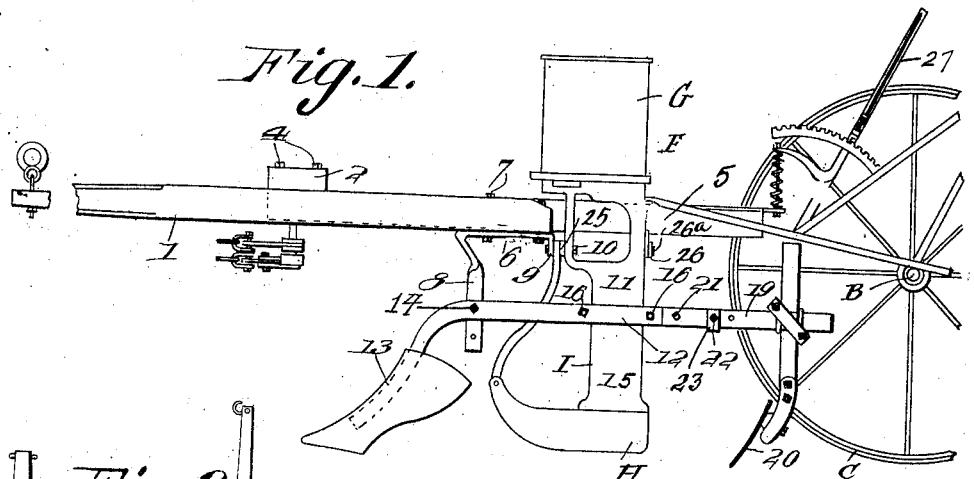
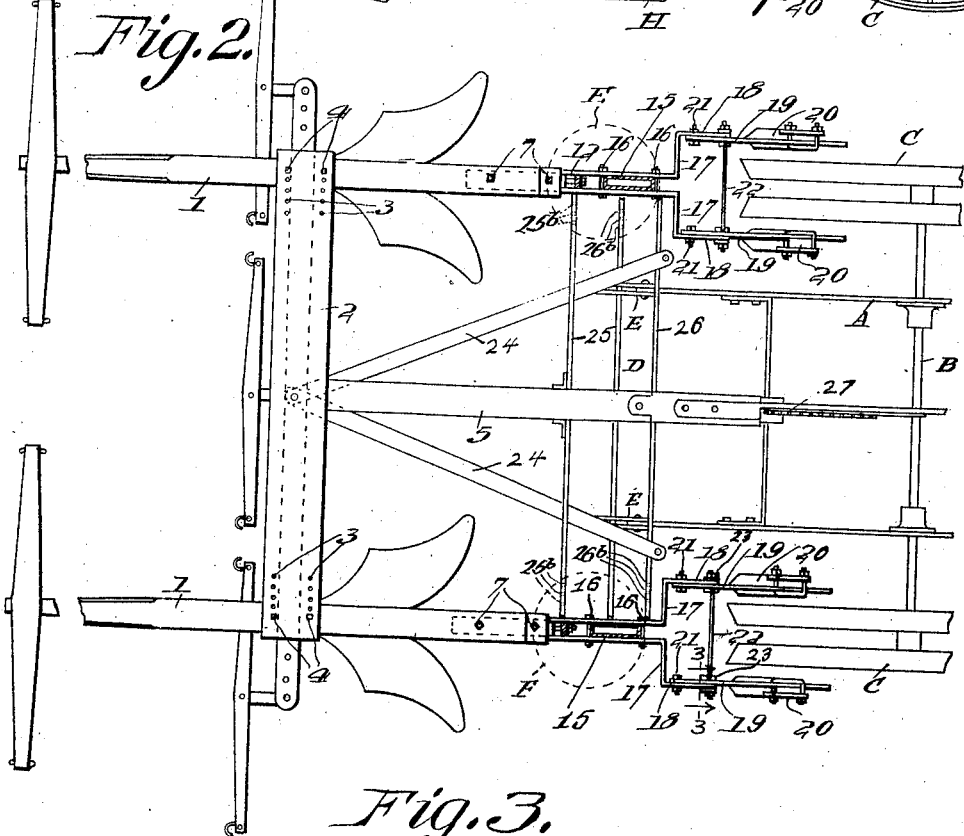

UNITED STATES PATENT OFFICE.

JOHN B. HENEFIELD AND EDWARD I. HENEFIELD, OF SAN ANTONIO, TEXAS.

TWO-ROW COTTON AND CORN PLANTER.

1,078,282.  Specification of Letters Patent.   Patented Nov. 11, 1913.

Application filed April 4, 1911. Serial No. 618,918.

*To all whom it may concern:*

Be it known that we, JOHN B. HENEFIELD and EDWARD I. HENEFIELD, citizens of the United States, residing at San Antonio, in the county of Bexar and State of Texas, have invented certain new and useful Improvements in Two-Row Cotton and Corn Planters, of which the following is a specification.

This invention pertains to certain new and useful improvements in planters and relates more particularly to cotton and corn planters of the two row type.

A machine embodying our invention is especially adapted and intended for use for planting cotton or other seeds on "beds" or "listed" land. It is customary to plant the cotton on the "beds" and in doing this it is desirable to break up the soil on the top of the "beds" in order to partly level the land and in order to destroy weeds and leave a free space for the growth of the plants. It has heretofore been proposed to provide planters with sweeps or plows in advance of the seed separating and depositing mechanisms to cultivate and level the ground. The devices heretofore proposed have, however, been open to serious objections. Heretofore the sweeps or plows have been mounted on planters having but a single pole, provision being made for two draft animals one on each side of the pole. This arrangement has made it necessary for the draft animals to walk on the "beds," and it has been found from experience that the animals will not do this, preferring to walk between the "beds." Furthermore, the mounting and supporting of the sweeps or plows at points out of alinement with the pole has made it impossible for them to be maintained at uniform levels during operation. On account of the resiliency of the planter frame and of the pole the planters of this type as heretofore constructed have been open to the serious objection that one or the other of the plows or sweeps would "suck in" below normal depth thus raising the plow or sweep. But this action of the plows or sweeps has been very uneven, first one plow or sweep and then the other being drawn out of its normal level.

The principal object of our invention, therefore, is to provide a planter in which there are means for rigidly supporting the plows or sweeps to prevent changes in the depth of cut as the planter is operated.

A further object is to provide a draft arrangement such that the animals can walk between the "beds" instead of on them.

Another object is to provide a readily detachable draft mechanism which is also adapted to support plows or sweeps in advance of the seed separating and depositing mechanism.

Another object is to provide improved devices for covering the seeds after depositing.

Still further objects will be apparent from the following specification and claims.

The accompanying drawings show one embodiment of our invention. The construction shown has, however, been selected merely for purposes of illustration and it will be understood that various changes and modifications may be made within the scope of the appended claims without departing from the spirit of our invention.

In the drawings, Figure 1 is a side elevation of a two row planter equipped with the present invention, Fig. 2 is a top plan view thereof, some of the parts being shown in section, and Fig. 3 is a section on the line 3—3 of Fig. 2.

A represents the main frame of the planter which is mounted upon the axle B and the supporting and covering wheels C, C.

D represents as a whole the forward frame of the planter which is pivotally connected at E, E, with the main frame A. The relative positions of the two planter frames are controlled by means of the lever 27 and the parts associated with it.

F, F, are the two seeder mechanisms each of which comprises a seed separating mechanism, a seed hopper G and a furrow opening runner H. These are connected by the shank I through which seed is allowed to pass to be deposited in the ground.

The forward frame D of the planter comprises two parallel bars 25 and 26, and the seeder mechanisms F, F, are secured to the ends of these bars by means of bolts 10 and 26ª. The bars 25 and 26 are provided at their ends with a plurality of bolt holes 25ᵇ and 26ᵇ in order that the positions of the seeder mechanisms may be varied to adjust the distance between the rows.

1, 1, designate the poles of the planter on the top faces of which latter is secured a cross bar 2, the ends of which latter are provided with series of bolt openings 3 for the reception of securing bolts 4, whereby the distance between the poles can be adjusted in accordance with the adjustment of the distance between the rows.

5 designates a rearward extending stub pole, which is secured to the cross bar 2. Secured to the under face of each of the poles 1 at the rear ends of the latter is a substantially L-shaped member 6, the foot of which is secured by means of bolts 7 to the pole, and the leg 8 depends from the foot 6 at approximately right angles to the latter. The rear end of the member 6 is bent downward to form an ear 9 which is secured by means of a bolt 10 to the frame of the planter, the latter being generally designated by 11. Beneath each pole 1 and adjacent the corresponding seed separating and depositing mechanism F is a plow beam designated by 12. Each beam carries a plow 13 at its forward end, there being a bolt 14 which passes through the beam adjacent the plow and which is secured to the leg 8 of the L-shaped member 6. The plow beam 12, as shown in Fig. 2 of the drawings, is formed of two spaced strips of material which receive therebetween the seed boot 15 of the corresponding seeder mechanism F. Bolts 16 engage the front and rear sides of the seed boot and pass through the two strips forming the beam 12. The rear ends of the two strips forming the beam 12 are bent outward at right angles as at 17 and are then extended rearward as at 18. The rearward extensions 18 have secured thereto angle bar clips 23, as shown in Fig. 3, in order that the arms 19 of the covering shovels 20 may abut the horizontal portion of the angle bars and thereby be restricted in their downward movement. The arms 19 of the covering shovels 20 are pivoted as at 21 to the extensions 18 of the plow beam and are secured to each other by rods 22. It will thus be observed that the covering shovels have a pivotal movement about the bolts 21 and thus obviously provide for any rocky or uneven condition of the ground.

24 designates braces which extend from the cross bar 2 to the cross pieces 25 and 26 of the planter frame.

While we have referred to the devices at 13 as plows we desire it to be understood that our invention is not limited to plows of the exact form shown in the drawings but includes any devices adapted to be moved in advance of the furrow openers to remove weeds or to loosen and cultivate the soil. It will be observed that the poles and associated parts can be readily attached to or detached from the other parts of the planter. In fact, the arrangement is such that a planter of the usual form having a single pole can be used merely by removing the pole and placing our improved mechanism in position, the central stub pole taking the place of the usual main planter pole.

The plow beams 14 are also readily detachable and can be quickly put in place or removed as desired.

What is claimed is:

1. In a planter, the combination of a frame, wheels for supporting the frame, two seed separating and depositing mechanisms secured to the frame in a manner to permit transverse adjustment, two forward extending poles secured to the frame in alinement respectively with the seed separating and depositing mechanisms and transversely adjustable therewith, a cross bar extending transversely between the two poles in advance of the frame and connected near its ends to the poles in a manner to permit the transverse adjustment of the poles, means for attaching two or more draft animals to the planter and to the forward ends of the poles, each pole being between two animals, two plows respectively arranged directly in front of the seed separating and depositing mechanisms and below the poles, the plows being transversely adjustable with the seed separating and depositing mechanisms and with the poles, and means for connecting each plow directly to the corresponding pole.

2. In a planter, the combination of a frame, wheels for supporting the frame, two seed separating and depositing mechanisms secured to the frame, two parallel poles adapted to be secured to the frame in alinement respectively with the seed separating and depositing mechanism, means independent of the frame for connecting the two poles together to normally hold them in fixed relationship to each other, means for attaching two or more draft animals to the planter and to the forward ends of the poles, each pole being between two animals, two plows adapted to be respectively positioned directly in front of the seed separating and depositing mechanisms and below the poles, and means adapted for directly connecting the plows to the corresponding poles when the poles are attached to the frame.

3. In a planter, the combination of a frame, wheels for supporting the frame, two seed separating and depositing mechanisms secured to the frame, two forward extending poles secured to the frame in alinement respectively with the seed separating and depositing mechanisms, means for attaching two or more draft animals to the planter and to the forward ends of the poles, each pole being between two animals, two plows respectively arranged directly in front of the seed separating and depositing mechanisms and below the poles, and means for connecting each plow directly to the corresponding pole.

4. In a planter, the combination of a frame, wheels for supporting the frame, two seed separating and depositing mechanisms secured to the frame, two forward extending poles secured to the frame in alinement respectively with the seed separating and depositing mechanisms, means for attaching two or more draft animals to the planter and to the forward ends of the poles, each pole being between two animals, two plows respectively arranged directly in front of the seed separating and depositing mechanisms and below the poles, and means for connecting each plow directly to the corresponding pole in a manner to permit vertical adjustment.

5. In a planter the combination of a frame, wheels for supporting the frame, two seed separating and depositing mechanisms secured to the frame, two forward extending poles secured to the frame in alinement respectively with the seed separating and depositing mechanisms, means for attaching draft animals to the planter and to the forward ends of the poles, at least one animal being positioned at the outer side of each pole, two plows respectively arranged directly in front of the seed separating and depositing mechanisms and below the poles, and means for connecting each plow directly to the corresponding pole.

6. In a planter, the combination of a frame, wheels for supporting the frame, two seed separating and depositing mechanisms secured to the frame, two forward extending poles secured to the frame in alinement respectively with the seed separating and depositing mechanisms, means for attaching draft animals to the planter and to the forward ends of the poles, at least one animal being positioned at the outer side of each pole and at least one animal being positioned between the poles, two plows respectively arranged directly in front of the seed separating and depositing mechanisms and below the poles, and means for connecting each plow directly to the corresponding pole.

7. In a planter, the combination of a frame, wheels for supporting the frame, two seed separating and depositing mechanisms secured to the frame in a manner to permit transverse adjustment, two forward extending poles secured to the frame in alinement respectively with the seed separating and depositing mechanisms and transversely adjustable therewith, means for attaching two or more draft animals to the planter and to the forward ends of the poles, each pole being between two animals, two plows respectively arranged directly in front of the seed separating and depositing mechanisms and below the poles, the plows being transversely adjustable with the seed separating and depositing mechanisms and with the poles, and means for connecting each plow directly to the corresponding pole.

8. In a planter, the combination of a main frame, two seed separating and depositing mechanisms secured to the frame, two wheels upon which the frame is partly supported, each wheel being positioned directly behind one of the seed separating and depositing mechanisms and serving as a means for covering the seeds and packing the earth over them, two forward extending poles secured to the frame in alinement respectively with the seed separating and depositing mechanisms, means for attaching two or more draft animals to the planter and to the forward ends of the poles, each pole being between two animals, two plows respectively arranged directly in front of the seed separating and depositing mechanisms and below the poles, and means for connecting each plow directly to the corresponding pole.

9. In a planter, the combination of a frame having forward and rear parts pivotally connected together along a horizontal transverse line, means for adjusting the relative positions of the two parts and for holding them in adjusted positions, supporting wheels connected with the rear part of the frame, seed separating and depositing mechanisms mounted upon the forward part of the frame, two forward extending poles secured to the forward part of the frame in alinement respectively with the seed separating and depositing mechanisms, means for attaching two or more draft animals to the planter and to the forward ends of the poles, each pole being between two animals, two plows respectively arranged directly in front of the seed separating and depositing mechanisms and below the poles, and means for connecting each plow to the corresponding pole.

10. In a planter, the combination of a frame having forward and rear parts pivotally connected together along a horizontal transverse line, means for adjusting the relative positions of the two parts and for holding them in adjusted positions, seed separating and depositing mechanisms mounted upon the forward part of the frame, two wheels connected with the rear part of the frame, each wheel being positioned directly behind one of the seed separating and depositing mechanisms and serving as a means for covering the seeds and packing the earth over them, two forward extending poles secured to the forward part of the frame in alinement respectively with the seed separating and depositing mechanisms, means for attaching two or more draft animals to the planter and to the forward ends of the poles, each pole being between two animals, two plows respectively arranged directly in front of the seed separating and depositing mechanisms and below the poles, and means for connecting each plow to the corresponding pole.

11. In a planter, the combination of a frame, wheels for supporting the frame, two seed separating and depositing mechanisms secured to the frame, two forward extending poles secured to the frame in alinement respectively with the seed separating and depositing mechanisms, means for attaching two or more draft animals to the planter and to the forward ends of the poles, each pole being between two animals, two plows respectively arranged directly in front of the seed separating and depositing mechanisms and below the poles, means for connecting each plow directly to the corresponding pole, and means behind the seed separating and depositing mechanisms for covering the seeds, the said means being supplemental to the said supporting wheels.

12. In a planter, the combination of a frame, two seed separating and depositing mechanisms secured to the frame, two wheels upon which the frame is partly supported, each wheel being positioned directly behind one of the seed separating and depositing mechanisms and serving as a means for covering the seeds and packing the earth over them, two forward extending poles secured to the frame in alinement respectively with the seed separating and depositing mechanisms, means for attaching two or more draft animals to the planter and to the forward parts of the poles, each pole being between two animals, two plows respectively arranged directly in front of the seed separating and depositing mechanisms and below the poles, means for connecting each plow directly to the corresponding pole, and means behind the seed separating and depositing mechanisms for covering the seeds, the said means being supplemental to the said supporting and covering wheels.

13. In a planter, the combination of a main frame, wheels for supporting the main frame, two seed separating and depositing mechanisms mounted on the frame, a centrally located forward extending stub pole secured at its rear end to the frame, two side poles arranged to longitudinally aline with the seed separating and depositing mechanisms, means for connecting the side poles with the central stub pole, means for connecting the rear ends of the side poles with the frame, means for attaching draft animals to the poles, and two plows respectively arranged in advance of the seed separating and depositing mechanisms and below the poles, and means for connecting each plow directly to the corresponding side pole.

14. In a planter, the combination of a main frame, wheels for supporting the main frame, two seed separating and depositing mechanisms mounted on the frame, a centrally located forward extending stub pole secured at its rear end to the frame, two side poles arranged to longitudinally aline with the seed separating and depositing mechanisms, means for connecting the side poles with the central stub pole, means for connecting the rear ends of the side poles with the frame, means for attaching draft animals to the poles, two longitudinally extending horizontal elements at the sides of the planter, means for securing each of the said elements to the corresponding seed separating and depositing mechanisms, means for securing each of the said elements to the corresponding side pole, two plows respectively arranged directly in advance of the seed separating and depositing mechanisms on the forward parts of the said horizontal elements.

15. In a planter, the combination of a main frame, wheels for supporting the main frame, two seed separating and depositing mechanisms mounted on the frame, a centrally located forward extending stub pole secured at its rear end to the frame, two side poles arranged to longitudinally aline with the seed separating and depositing mechanisms, means for connecting the side poles with the central stub pole, means for connecting the rear ends of the side poles with the frame, means for attaching draft animals to the poles, two longitudinally extending horizontal elements at the sides of the planter, means for securing each of the said elements to the corresponding seed separating and depositing mechanisms, means for securing each of the said elements to the corresponding side poles, two plows respectively arranged directly in advance of the seed separating and depositing mechanisms on the forward parts of the horizontal elements, and seed covering devices secured to the rear ends of the said horizontal elements.

16. In a planter, the combination of a frame, wheels for supporting the frame, two seed separating and depositing mechanisms secured to the frame and each provided with an upright seed boot, two forward extending poles secured to the frame in alinement respectively with the seed separating and depositing mechanisms, means for attaching draft animals to the planter and to the poles, four horizontal beam elements arranged in pairs at the sides of the planter with the beam elements of each pair positioned one at each side of one seed boot, means for connecting the forward ends of the elements of each pair to the corresponding pole, and two pairs of seed covering devices each connected to the rear end of one of the said horizontal beam elements and positioned behind and at one side of the corresponding seed separating and depositing mechanism.

17. In a planter, the combination of a frame, wheels for supporting the frame, two seed separating and depositing mechanisms secured to the frame and provided with an upright seed boot, two forward extending poles secured to the frame in alinement respectively with the seed separating and depositing mechanisms, means for attaching the planter and to the draft animals to the poles, two plows respectively arranged directly in front of the seed separating and depositing mechanisms and below the poles, means for connecting each plow directly to the corresponding pole, four horizontal beam elements arranged in pairs at the sides of the planter with the beam elements of each pair positioned one at each side of one seed boot, means for connecting the forward ends of the beam elements of each pair to the corresponding pole, and two pairs of seed covering devices each connected to the rear end of one of said horizontal beam elements and positioned behind and at one side of the corresponding seed separating and depositing mechanism.

18. In a planter, the combination of a frame, wheels for supporting the frame, two seed separating and depositing mechanisms secured to the frame and each provided with an upright seed boot, two forward extending poles secured to the frame in alinement respectively with the seed separating and depositing mechanisms, means for attaching draft animals to the planter and to the poles, four horizontal beam elements arranged in pairs at the sides of the planter with the beam elements of each pair positioned one at each side of one seed boot, means for connecting the forward ends of the elements of each pair to the corresponding pole, and two pairs of seed covering devices each connected to the rear end of one of the said horizontal beam elements and positioned behind and at one side of the corresponding seed separating and depositing mechanism, a pivotal connection being interposed between each covering device and the corresponding pole.

19. In a planter, the combination of a frame, wheels for supporting the frame, two seed separating and depositing mechanisms secured to the frame and each provided with an upright seed boot, two forward extending poles secured to the frame in alinement respectively with the seed separating and depositing mechanisms, means for attaching draft animals to the planter and to the poles, four horizontal beam elements arranged in pairs at the sides of the planter with the beam elements of each pair positioned one at each side of one seed boot, the forward parts of the elements of each pair being parallel and the rear parts being separated from each other farther than the forward parts, means for connecting the forward ends of the elements of each pair to the corresponding pole, and two pairs of seed covering devices each connected to the rear end of one of the said horizontal beam elements and positioned behind and at one side of the corresponding seed separating and depositing mechanism.

20. In a planter, the combination of a frame, wheels for supporting the frame, two seed separating and depositing mechanisms secured to the frame and each provided with an upright seed boot, two forward extending poles secured to the frame in alinement respectively with the seed separating and depositing mechanisms, means for attaching draft animals to the planter and to the poles, four horizontal beam elements arranged in pairs at the sides of the planter with the elements of each pair positioned one at each side of one seed boot, the forward parts of the elements of each pair being parallel and the rear parts being separated from each other farther than the forward parts, means for connecting the forward ends of the elements of each pair to the corresponding pole, spacers extending transversely between the separated rear end parts of the elements of the two pairs, and two pairs of seed covering devices each connected to the rear end of one of the said horizontal beam elements and positioned behind and at one side of the corresponding seed separating and depositing mechanism.

In testimony whereof we affix our signatures in presence of two witnesses.

JOHN B. HENEFIELD.
EDWARD I. HENEFIELD.

Witnesses:
W. A. J. ROACH,
L. G. MARR.